(12) United States Patent
MacFarlane et al.

US010025771B2

(10) Patent No.: US 10,025,771 B2
(45) Date of Patent: Jul. 17, 2018

(54) METHOD AND APPARATUS FOR PROVIDING SHARED ANNOTATIONS AND RECALL OF GEOSPATIAL INFORMATION

(71) Applicant: HERE Global B.V., Veldhoven (NL)

(72) Inventors: Jane MacFarlane, Oakland, CA (US); Craig Barnes, Forest Park, IL (US)

(73) Assignee: HERE Global B.V., Veldhoven (NL)

( * ) Notice: Subject to any disclaimer, the term of this patent is extended or adjusted under 35 U.S.C. 154(b) by 398 days.

(21) Appl. No.: 14/706,494

(22) Filed: May 7, 2015

(65) Prior Publication Data

US 2016/0328376 A1 Nov. 10, 2016

(51) Int. Cl.
| | |
|---|---|
| *G06F 3/048* | (2013.01) |
| *G06F 17/27* | (2006.01) |
| *H04N 7/15* | (2006.01) |
| *G06F 17/24* | (2006.01) |
| *H04L 29/06* | (2006.01) |
| *G10L 15/18* | (2013.01) |

(52) U.S. Cl.
CPC ........ *G06F 17/2705* (2013.01); *G06F 17/241* (2013.01); *G06F 17/2785* (2013.01); *H04L 65/1066* (2013.01); *H04N 7/15* (2013.01); *G10L 15/1822* (2013.01)

(58) Field of Classification Search
CPC .............................................. G01C 21/3617
See application file for complete search history.

(56) References Cited

U.S. PATENT DOCUMENTS

| | | | |
|---|---|---|---|
| 7,031,724 B2 | 4/2006 | Ross et al. | |
| 7,913,179 B2 | 3/2011 | Sheha et al. | |
| 8,139,514 B2 | 3/2012 | Weber et al. | |
| 8,401,771 B2 | 3/2013 | Krumm et al. | |
| 2007/0288164 A1 | 12/2007 | Gordon et al. | |
| 2009/0265242 A1* | 10/2009 | Horvitz | G06Q 30/02 705/14.52 |

(Continued)

OTHER PUBLICATIONS

Ashikaga et al., Abstract of "Exploring Map-based Interactions for Co-located Collaborative Work by Multiple Mobile Users", Proceedings of the 19th ACM SIGSPATIAL International Conference on Advances in Geographic Information Systems, 2011, 2 pages.

*Primary Examiner* — Claudia Dragoescu
(74) *Attorney, Agent, or Firm* — Ditthavong & Steiner, P.C.

(57) ABSTRACT

An approach is provided for sharing annotations and recalling geospatial information. The approach involves processing and/or facilitating a processing of communication information exchanged between a plurality of devices engaged in a communication session to cause, at least in part, a parsing of geospatial information from the communication information. The approach also involves determining whether the geospatial information meet, at least in part, one or more logic thresholds. The one or more logic thresholds are for determining a potential relevance of the geospatial information to the communication session, the plurality of devices, one or more users of the plurality of devices, or a combination thereof. The approach further involves causing, at least in part, a presentation of the geospatial information to the plurality of devices, the one or more users, or a combination thereof based, at least in part, on the determination.

15 Claims, 11 Drawing Sheets

(56) References Cited

U.S. PATENT DOCUMENTS

| | | | |
|---|---|---|---|
| 2011/0161427 A1* | 6/2011 | Fortin | H04L 51/20 |
| | | | 709/206 |
| 2011/0320114 A1* | 12/2011 | Buxton | G01C 21/362 |
| | | | 701/439 |
| 2012/0005224 A1* | 1/2012 | Ahrens | G06Q 10/10 |
| | | | 707/769 |
| 2012/0136529 A1* | 5/2012 | Curtis | G01C 21/20 |
| | | | 701/32.2 |
| 2013/0325920 A1 | 12/2013 | Peterson et al. | |
| 2014/0173467 A1* | 6/2014 | Clavel | H04L 12/1822 |
| | | | 715/758 |
| 2014/0229861 A1 | 8/2014 | Hellstrom | |
| 2014/0274107 A1* | 9/2014 | Rados | G06F 17/30241 |
| | | | 455/456.1 |

\* cited by examiner

METHOD AND APPARATUS FOR PROVIDING SHARED ANNOTATIONS AND RECALL OF GEOSPATIAL INFORMATION

BACKGROUND

Service providers and device manufacturers (e.g., wireless, cellular, etc.) are continually challenged to deliver value and convenience to consumers by, for example, providing compelling network services. One area of interest has been the development of mapping, navigation, and/or other location-based services for accessing geospatial information (e.g., map or location related information). In some cases, these services also enable users to annotate the geospatial information (e.g., drawing on a map, highlighting key points-of-interest, etc.). However, accessing and annotating geospatial information via such services (e.g., looking at a map and marking up the map) traditionally has been a singularly-focused process that often imposes significant burdens on a user when the user wants to share the geospatial information and any associated annotations. Accordingly, service providers and device manufacturers face significant technical challenges to enabling efficient sharing of geospatial information and related information.

Some Example Embodiments

Therefore, there is a need for an approach for providing shared annotations and recall of geospatial information among multiple devices.

According to one embodiment, a method comprises processing and/or facilitating a processing of communication information exchanged between a plurality of devices engaged in a communication session to cause, at least in part, a parsing of geospatial information from the communication information. The method also comprises determining whether the geospatial information meet, at least in part, one or more logic thresholds. The one or more logic thresholds are for determining a potential relevance of the geospatial information to the communication session, the plurality of devices, one or more users of the plurality of devices, or a combination thereof. The method further comprises causing, at least in part, a presentation of the geospatial information to at least one of the plurality of devices, the one or more users, or a combination thereof based, at least in part, on the determination.

According to another embodiment, an apparatus comprises at least one processor, and at least one memory including computer program code, the at least one memory and the computer program code configured to, with the at least one processor, cause, at least in part, the apparatus to process and/or facilitate a processing of communication information exchanged between a plurality of devices engaged in a communication session to cause, at least in part, a parsing of geospatial information from the communication information. The apparatus is also caused to determine whether the geospatial information meet, at least in part, one or more logic thresholds. The one or more logic thresholds are for determining a potential relevance of the geospatial information to the communication session, the plurality of devices, one or more users of the plurality of devices, or a combination thereof. The apparatus further causes, at least in part, a presentation of the geospatial information to at least one of the plurality of devices, the one or more users, or a combination thereof based, at least in part, on the determination.

According to another embodiment, a computer-readable storage medium carries one or more sequences of one or more instructions which, when executed by one or more processors, cause, at least in part, an apparatus to process and/or facilitate a processing of communication information exchanged between a plurality of devices engaged in a communication session to cause, at least in part, a parsing of geospatial information from the communication information. The apparatus is also caused to determine whether the geospatial information meet, at least in part, one or more logic thresholds. The one or more logic thresholds are for determining a potential relevance of the geospatial information to the communication session, the plurality of devices, one or more users of the plurality of devices, or a combination thereof. The apparatus further causes, at least in part, a presentation of the geospatial information to at least one of the plurality of devices, the one or more users, or a combination thereof based, at least in part, on the determination.

According to another embodiment, an apparatus comprises means for processing and/or facilitating a processing of communication information exchanged between a plurality of devices engaged in a communication session to cause, at least in part, a parsing of geospatial information from the communication information. The apparatus also comprises means for determining whether the geospatial information meet, at least in part, one or more logic thresholds. The one or more logic thresholds are for determining a potential relevance of the geospatial information to the communication session, the plurality of devices, one or more users of the plurality of devices, or a combination thereof. The apparatus further comprises means for causing, at least in part, a presentation of the geospatial information to at least one of the plurality of devices, the one or more users, or a combination thereof based, at least in part, on the determination.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing shared annotations and recall of geospatial information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
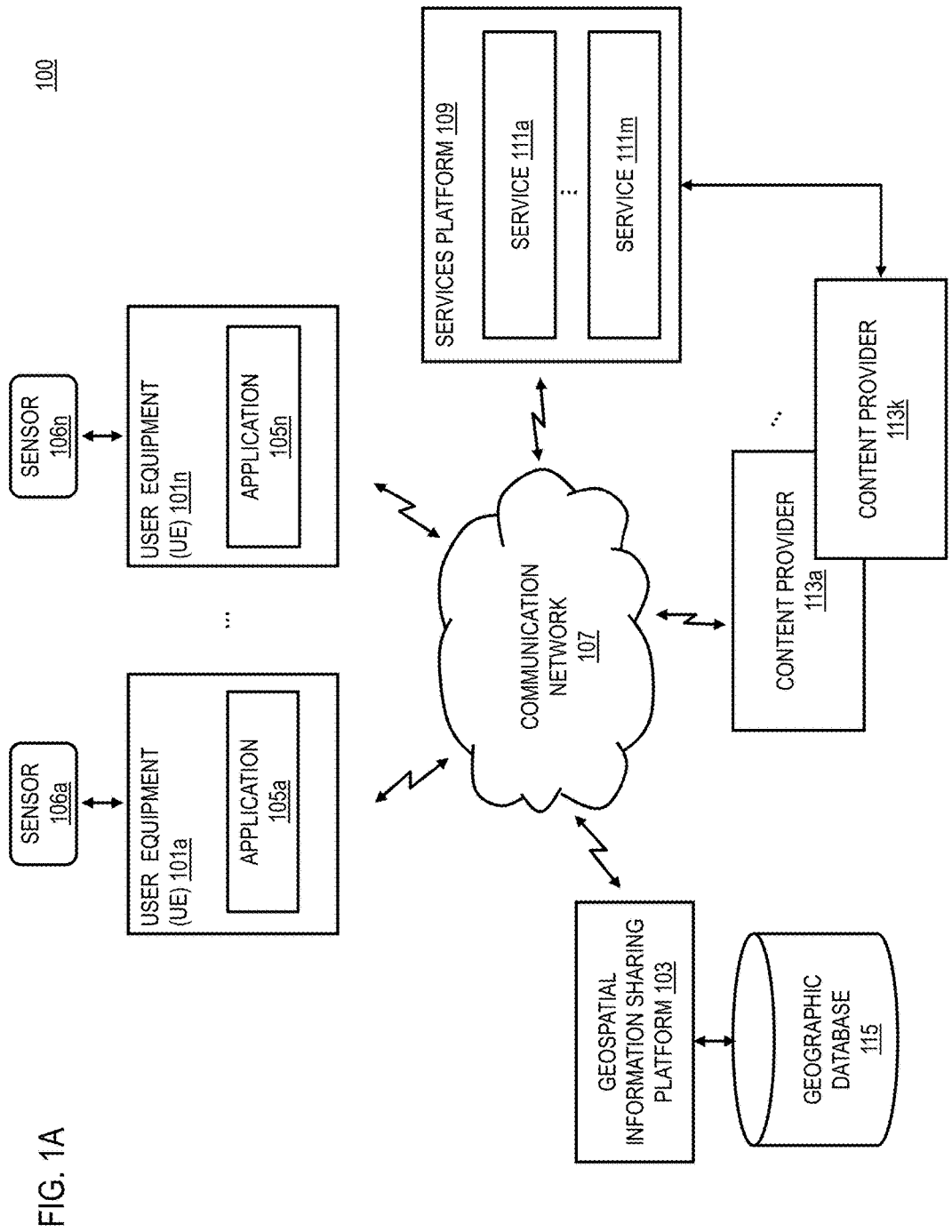
FIG. 1A is a diagram of a system capable of providing shared annotations and recall of geospatial information, according to one embodiment.

FIG. 1 is a diagram of a system capable of providing shared annotations and recall of geospatial information, according to one embodiment. Mapping, navigation, and other location-based services are increasingly becoming a more collaborative or shared process. For example, when a user identifies geospatial information (e.g., a place and/or a route) and/or related annotations in a location-based service, it is often the user's intention to share the geospatial information/annotations with others (e.g., to suggest a meeting place, give directions, coordinate a meeting, etc.). Many times, the desire to share a location arises during a conversation among users, such as during a text messaging conversation, audio call, video call, etc. Traditionally, in contexts like these, users can share geospatial information as a verbal description, a screen capture using a copy and paste process, or if the other user is in local proximity the sharing user can offer the user's device to the other user for viewing. However, because the user is engaged in conversation (e.g., a communication session) with the others users, traditional geospatial information sharing processes can become cumbersome (e.g., requiring exiting the communication application to access sharing applications and then returning to the original communication application) that can potentially disrupt the communication session or conversation.

To address this problem, a system 100 introduces a capability to mirror geospatial information across devices based on information parsed from communications between the devices. In one embodiment, if two are more users (e.g., via their respective devices such as user equipment (UEs) 101a-101n as shown in FIG. 1, also collectively referred to as UEs 101), a geospatial information sharing platform 103 will pick up on the communication session and then provide mapping information to the users/devices involved in the conversation or communication session via "intelligent listening." For example, if two or more users are talking or texting, the geospatial information sharing platform 103 may determine if a point of interest (POI), geographically associated feature, and/or other geospatial information is discussed during the conversation (e.g., by parsing textual, audio, video, etc. information captured during the conversation).

In one embodiment, the geospatial information sharing platform 103 then applies logic thresholds or rules to determine a potential relevance of the geospatial information to the conversation and/or the users and to initiate an automatic presentation of the geospatial information on participating devices. By way of example, one logic threshold or rule can be based on a predetermined number of times a particular piece of geospatial information (e.g., a POI name, a location, etc.) is mentioned during the conversation (e.g., a minimum of three times), or a predetermined number of users who mention the geospatial information (e.g., mentioned by at least two users). Accordingly, if the geospatial information is parsed and counted to meet the thresholds, the geospatial information sharing platform 103 can present the geospatial on participating devices (e.g., by initiating respective mapping applications on the respective devices to show the geospatial information). In one embodiment, the geospatial information sharing 103 can also be configured to recognize a role associated with a particular user as part of the logic threshold. For example, if a device or user is designated as a leader (e.g., a parent device), one mention of geospatial information may be sufficient to initiate sharing of the information to other devices; whereas multiple mentions by multiple follower devices (e.g., child devices) may be required to initiate sharing of the geospatial information.

In one embodiment, the geospatial information sharing platform 103 may use semantic analysis to "understand" or identify user preference information associated with mentions of geographical information as part of its logic thresholds or rules. For example, the geospatial information sharing platform 103 can use semantic rules to infer the content or context of the conversation and based on that context or content, the geospatial information sharing platform 103 can automatically provide or present the geospatial information to participating devices. For example, the geospatial information sharing platform 103 may parse a conversation or communication session (e.g., using voice recognition) as follows: "John: Do you want to go to Restaurant A" "Mary: No, been there too many times" "Mary: How about Restaurant B" "John: I have never been there, sounds good". Based on this parsed conversation, the geospatial information sharing platform 103, for instance, presents only a map indicating Restaurant B and not Restaurant A on John's and/or Mary's devices.

In one embodiment, the geospatial information sharing platform 103 can use other mechanisms to indicate or input geospatial information. For example, in one embodiment, the geospatial information sharing platform 103 can enable a user to indicate with gestures or drawings mechanisms geospatial information (e.g., a location or a general geographic area), and then generate the same geospatial information on other devices that have been identified as part of a conversation or communication session among users. A user can, for instance, identify a restaurant to meet at with a gesture on their mobile device (e.g., UE 101). This information will be communicated to other UEs 101 that are participating in the communication session. The other UEs 101 will automatically show the restaurant that has been identified and any annotation that the original user has added. In one embodiment, all users in the conversation will see the same display and annotation on their own device. The receiving users can then save the information and recall it when necessary (e.g., for specific routing later in the day). In addition or alternatively, each device or UE 101 may configure different mapping or location-based applications (e.g., applications 105a-105n) to display the received geospatial information. In this case, the same information will be presented in a format specific to the configured mapping or location-based applications 105.

As shown in FIG. 1, the system 100 comprises the UEs 101 that may execute or be associated with the applications 105 and sensors 106a-106n (collectively referred to as sensors 106). By way of example, the sensors 106 may include various sensors for determining location and/or geospatial information. For example, the UEs 101 may utilize sensors 106 such as GPS or other satellite-based location receivers for determining geospatial or location information. The sensors 106 may also be used to perform cellular triangulation, assisted-GPS, or other location based techniques for determining the geographic coordinates of a UE 101. In addition, the sensors 110 may be used to gather temporal, spatial or environmental information regarding the UEs 101. By way of example, the sensors may detect speed and location data, tilt data (e.g., a degree of incline or decline of the vehicle along a path of travel), motion data, light data, sound data, image data, weather data and the like.

Still further, the sensors 106 may detect local or transient network and/or wireless signals, such as those transmitted by nearby devices during navigation of a vehicle associated with the user. This may include, for example, network routers as configured within a premise (e.g., home or business) or other UE 101 encountered during navigation to or within range of the point of interest. Other signals detected may include those transmitted by traffic related objects such as traffic lights, traffic cameras, signals, digital signage or the like. It is noted that, in certain implementations, the sensors of the vehicle may be configured to interact with the sensors 106 of the UE 101 for enabling data exchange (e.g., geospatial information exchange) and interaction. This exchange may be facilitated by way of any known or still developing range based or wireless communication protocols.

As noted above, in one embodiment, the geospatial information sharing platform 103 performs the functions associated with providing shared annotations and recall of spatial information. In one embodiment, the system 100 includes an infrastructure for sharing geospatial information in real-time on multiple devices that includes a map-based service, application, and/or web interface that provides a typical map user interface. By way of example, the map-based service, application, and/or interface can be provided over the communication network 107 by the services platform 109.

In one embodiment, the geospatial information sharing platform 103 may be configured to interface directly with the services platform 109 that provides various map or location based services 111a-111m (also collectively referred to as services 111). In addition, the geospatial information sharing platform 103 and/or the services platform 109 may interface with one or more content providers 117a-117k (also collectively referred to as content providers 117) that provide/deliver content of various types and genres (e.g., geospatial information, mapping content, navigation content, travel content, locality content, marketing content) upon request. Requests may be initiated via the communication network 107 by way of one or more location based applications 105 executing on the UEs 101 that further associated with respective users. By way of example, the applications 105 may access turn-by-turn navigation, routing information, maps, driving instructions, etc., for accessing, annotating, and/or sharing geospatial information. In one embodiment, the geospatial information sharing platform 103 can store and/or retrieve geospatial information, annotations, and/or other related information in a geographic database 115 (further described below with respect to FIG. 1B.

In one embodiment, the system 100 includes software to enhance the applications 105, the services 111, the services platform 109, the content providers 113, and/or any other component of the system to enable a user to identify places and/or areas of interest as well as any annotations the user has made, and then to communicate the geospatial information/annotation to a group of users in real-time. It is contemplated that the geospatial information need not be associated with a POI. Accordingly, in one embodiment, the system 100 can be used to augment (e.g., by automatically sharing parsed geospatial information) a conversation or communication session in which any location or location-related information is discussed. In one embodiment, the geospatial information and/or related annotations are saved on the participating users' UEs 101. In one embodiment, other receiving users by the originating user to create a conversation. In one embodiment, the system 100 may automatically detect the receiving or participating devices by, e.g., querying for device identifiers, user identifiers, etc. associated with a communication session.

By way of example, geospatial information includes, but is not limited to, information related to points-of-interest (restaurants, shopping, etc.), routes, public spaces (parks, libraries, etc.), geographic areas (towns, boroughs, city blocks, etc.), and other like geospatial information. Such information may be gathered as geospatial information or to supplement preexisting information, and may further include crowd source data, network information, public databases, public information (public transport schedules, etc.), and other like information. In one embodiment, geospatial information also may include a number of forms including particular words related to location, logos, visual images, acronyms, and other like forms which may indicate geospatial information.

As previously discussed, in one embodiment, the system 100 may determine whether the geospatial information meet one or more logic thresholds for determining a potential relevance of the geospatial information. In one scenario, the system 100 may employ one or more algorithms to recognize the geospatial information including text, audio, or video related recognition algorithms. The algorithms may include and employ a variety of techniques to recognize this geospatial information. By way of example, these techniques may include programs to analyze speech information, text information, visual images, etc. Furthermore, more sophisticated linguistic algorithms may be employed, for instance, to recognize parts of speech, past/future tense, positive/negative associations (POI A was good, POI B was not good, etc.), syntactic structure, language statistics (word frequency, etc.), and other like attributes as may be relevant for associating geospatial information with an attribute, a user device, a user, a communication session, or other like relationship. In one scenario, the system 100 may subsequently categorize the geospatial information as one or more of possible kinds of geospatial type information—points-of-interest, routes, locations, etc.

In one embodiment, the system 100 may cause, a presentation of the geospatial information based on a determination that geospatial information meet applicable logic thresholds. The presentation may include a variety of forms and manifestations. In one scenario, the system 100 may present communicated information (text, voice, etc.) as a user annotation associated with a particular point-of-interest (or route, etc.). Thus, in multiple scenarios, a particular user image, annotation, representation, or other introduced attribute may be linked to a particular user interface map view including both the user geospatial information in the context of a map/geospatial background. In one scenario, the system 100 may include a plurality of users within a conversation thread in which both the user geospatial information and the mapping background are mirrored across a plurality of devices. In one scenario, the system 100 may mirror the information precisely, so that one or more of a map view, user annotations, point-of-interest information, and other like information are uniform across a plurality of devices. In another scenario, the system 100 may subject the mirrored information to individual preferences/tolerances so that one or more of a map view, user annotations, point-of-interest information, and other like information are personalized with the option of a degree of uniformity in selected attributes.

In one embodiment, the system 100 may determine user preference information for the geospatial information based, at least in part, on the at least one context, the one or more semantic rules, or a combination thereof. In one embodiment, the system 100 by way of one or more users of a communication session may designate one or more individual preferences, which may be applicable to the geospatial information, the user interface (view point, etc.), mapping application, and other like information. In one scenario, the user may select to include or to not include geospatial information from a particular communication session. Such may depend on the interest or importance of the conversation as a whole, the complexity of the information communicated, and other like contextual information. In another scenario, the system 100 may select the type of information to be applicable to one or mapping applications. As an example, a user may only be interested in restaurant information, and thus choose to record or take part in conversation threads pertaining to restaurants. In one embodiment, the system 100 by way of one or more users may determine whether the geospatial information meets one or more logic thresholds based on user preference information. As discussed, in multiple scenarios, the logic thresholds may be of varied types, such as particular points-of-interest, types of information (restaurants, etc.), word frequencies; conformity with map locations, logo information, visual representations; and other like frameworks.

In one embodiment, the system 100 may cause a capturing of the communication information during the communication session. In multiple embodiments, the system 100 may extract the information from any of a text-based communication session, an audio-based communication session, a video-based communication session, or a combination thereof. In multiple embodiments, as discussed, the system 100 may capture geospatial information in a variety of forms from the communication session, such as from textual information, audio information, video information, or a combination thereof. As discussed, such information may be analyzed to determine geospatial information contained therein, which may be subsequently extracted and integrated with one or more mapping applications. In one embodiment, the system 100 may determine the parsing of the geospatial information, the presentation of the geospatial information, or a combination thereof, such that the parsing and subsequent presentation through a user interface is performed in real-time during the communication session. In one scenario, the system 100 may include an integration of the geospatial information recognition algorithms with a mapping application in real-time. Thus, as an example, a plurality of users may be engaged in a conversation while viewing a user-interface based map application. A user may engage in a conversation using one of a variety of means (text, voice, video, etc.) and view one or more annotations in real-time containing information that was extracted during the conversation. As discussed the algorithms may extract the data based on logical thresholds including the relevance of the conversation information to the geospatially based mapping application. Such information may be viewed as user texts, images, audio, video, then stored for one or more locations, so the said information may be viewed as an integrated part of the mapping information.

In one embodiment, the system 100 may determine one or more annotations associated with the geospatial information. In one embodiment, as discussed, the system 100 may recognize the communicated information as containing relevant geospatial information. For, applying such information, the system 100 may present one or more annotations containing the information. The annotations may include a multitude of forms such as text on the map, user images (to indicate the user, location information, etc.), logos, video, and other like information as may be relevant to the mapping application for the communication of geospatial information from one or more users. In one scenario, the system 100 may include a communication session as a conversation thread within a mapping application. Such a conversation may be accessed automatically when using the application or may be accessed manually as a point-and-click selection, a menu option, or selected in another analogous manner. This may be seen as a social media framework. In one scenario, the system 100 may determine the type of annotations that are to be included in one or more mapping applications. In another scenario, the type of annotations may be chosen by the user based on one or more selections (point-and-click, menus, etc.).

In one embodiment, the system 100 may determine historical experience information. In one embodiment, the system 100 may determine the geospatial information with respect to one or more of the plurality of devices, the one or more users, or a combination thereof. In one scenario, this determination may be performed, iteratively, over one or more time periods. In other words, the system 100 may catalogue geospatial information for an individual or a plurality of individuals on one or more devices. In this way, a user may have access to historical experience information that has been garnered and saved to one or more devices over one or more communication sessions. In one scenario, the system 100 may subsequently be able to retrieve historical experience information containing accumulated geospatial information of relevance for a multiplicity of features of a mapping application, such as that pertaining to points-of-interest, routes, locations, etc.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 105 may be any type of application that is executable at the UE 101, such as communication services (e.g., texting applications, calling applications, etc.), location-based service applications, navigation applications, camera/imaging application, media player applications, social networking applications, calendar applications, and the like. In one embodiment, one of the applications 105 at the UE 101 may act as a client for the geospatial information sharing platform 103 and perform one or more functions of the geospatial information sharing platform 103. In one scenario, users are able select and/or annotate geospatial information for identification via one or more map applications. In one embodiment, one or more receivers of the UE 101 may process geospatial information and/or annotations that meet predetermined logic thresholds for presentation at the receiving device.

By way of example, in addition to the sensor types discussed above, the sensors 106, in certain embodiments, may include a camera/imaging sensor for gathering image data, an audio recorder for gathering audio data, a global positioning sensor for gathering location data, a network detection sensor for detecting wireless signals or network data, temporal information and the like for use as annotations. In one embodiment, the sensors 106 may include, light sensors, orientation sensors augmented with height sensor and acceleration sensor, tilt sensors, moisture sensors, pressure sensors, audio sensors (e.g., microphone), or receivers for different short-range communications (e.g., Bluetooth, Wi-Fi, etc.). In one scenario, the one or more sensors 106 may detect attributes for mapping or routing (e.g., one or more modes of transportation). In another scenario, the one or more UE 101 may have sensors tuned to detect characteristic aggregates, whereby the sensor data may be calculated either on the cloud or by the UE 101 from the aggregates.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the components of the system 100 communicate with each other and other components using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
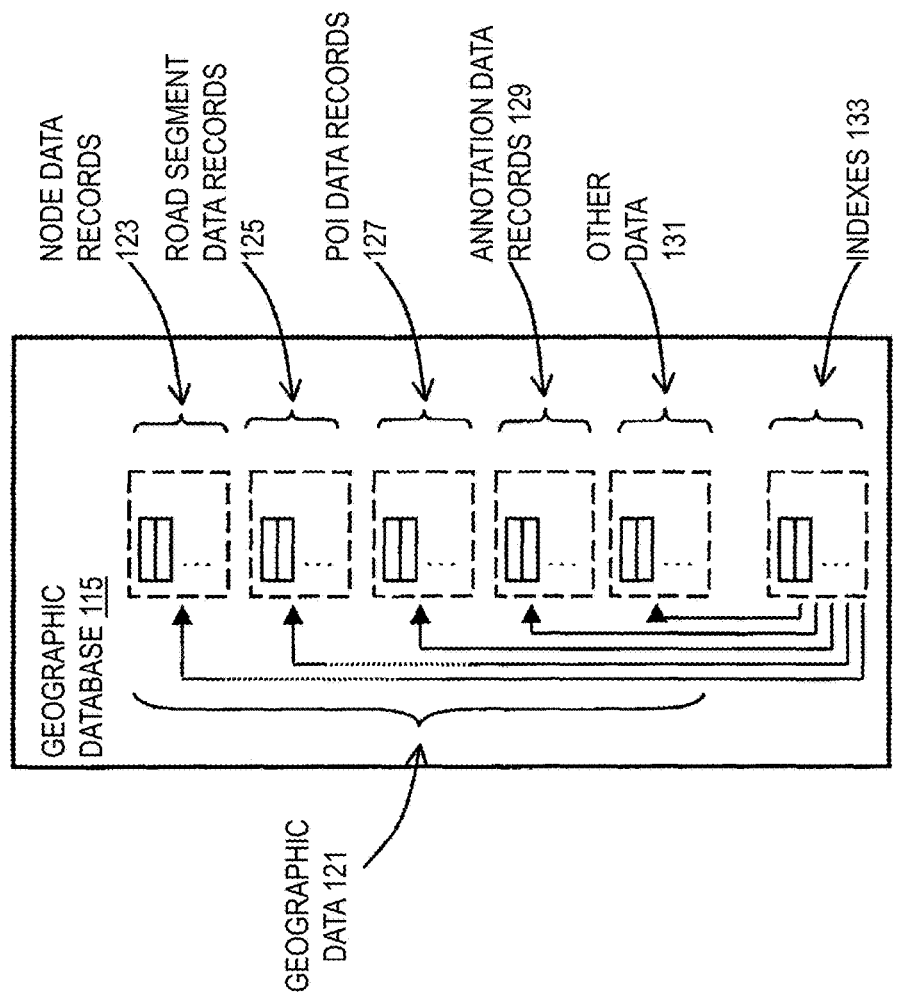
FIG. 1B is a diagram of the geographic database, according to one embodiment.

FIG. 1B is a diagram of the geographic database 115 of system 100, according to exemplary embodiments. In the exemplary embodiments, geospatial information (e.g., POIs and map generated POIs data) can be stored, associated with, and/or linked to the geographic database 115 or data thereof. In one embodiment, the geographic or map database 115 includes geographic data 121 used for (or configured to be compiled to be used for) mapping and/or navigation-related services, such as for personalized route determination, personalized annotations, and/or geospatial information sharing, according to exemplary embodiments. For example, the geographic database 115 includes node data records 123, road segment or link data records 125, POI data records 127, annotation data records 129, other data records 131 and indexes 133, for example. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 115 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 127. The geographic database 115 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). In addition, the geographic database 115 can include annotation data (e.g., generated via a manual and/or automatic processes according to various embodiments described herein) associated with the POI data records 127 and their respective locations in the annotation data records 129.

The geographic database 115 can be maintained by the content provider in association with the services platform 113 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database 115 or data in the master geographic database 115 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 115 can be a master geographic database, but in alternate embodiments, the geographic database 115 can represent a compiled navigation database that can be used in or with end user devices (e.g., UEs 101) to provided navigation-related functions. For example, the geographic database 115 can be used with the end user device 101 to provide an end user with navigation features. In such a case, the geographic database 115 can be downloaded or stored on the end user device UE 101, such as in applications 105, or the end user device UE 101 can access the geographic database 115 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for ranking of one or more road links.

Figure 2:
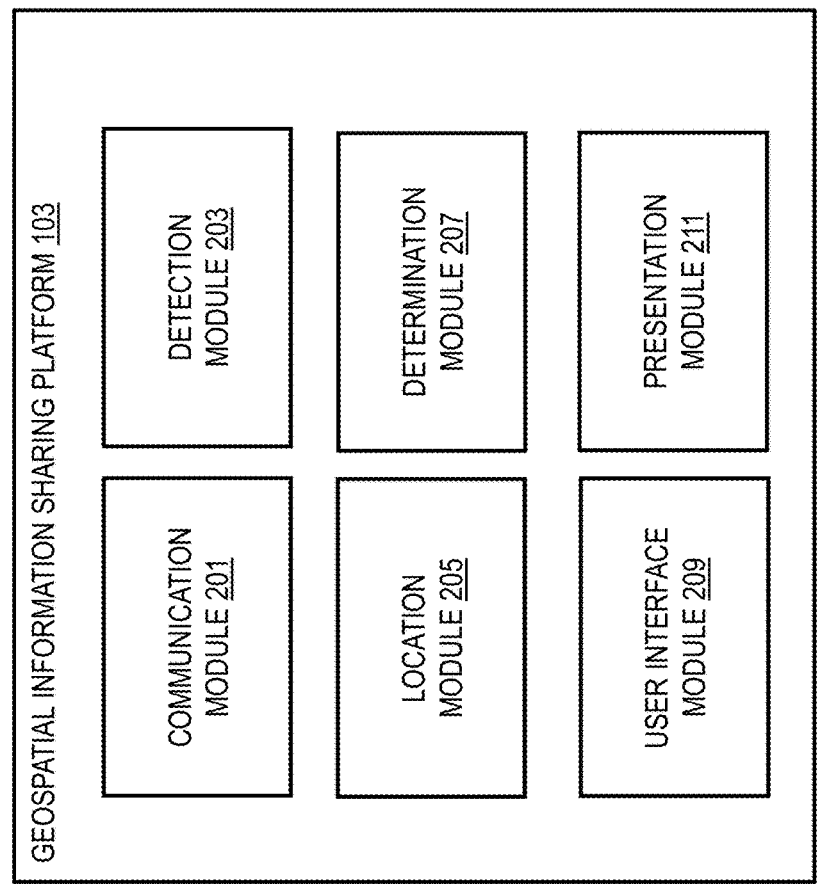
FIG. 2 is a diagram of the components of a geospatial information sharing platform, according to one embodiment.

FIG. 2 is a diagram of the components of a geospatial information sharing platform, according to one embodiment. By way of example, the geospatial information sharing platform 103 includes one or more components for providing shared annotations and recall of geospatial information. It is contemplated that the functions of these components may be combined in one or more components or performed by other components of equivalent functionality. In one embodiment, the geospatial information sharing platform 103 includes a communication module 201, a detection module 203, a location module 205, a determination module 207, a user interface module 209, and a presentation module 211.

In one embodiment, a communication module 201 detects or otherwise determines an establishment of a communication session over a communication network 107 between the UEs 101. By way of example, the communication module 201 executes various protocols and data sharing techniques for enabling collaborative execution between a subscriber's UE 101 and the network management platform 111 over the communication network 107. In one embodiment, the communication module 201 is configured to detect text-based sessions (e.g., SMS, instant messaging, etc.), multimedia-based sessions (e.g., MMS), audio sessions (e.g., voice calls), video sessions (e.g., video calls), and/or any other mode of communication supported by the UEs 101 and the communication network 107.

In one embodiment, the detection module 203 includes system algorithms, sensors 106, network databases, and/or one or more third-party content providers, such as content providers 117 for detecting relevant communication information related to geospatial information. The mapping and/or detection (including text, audio, video recognition) data can be preprogrammed into the geospatial information sharing platform 103, gathered from crowd source data network, or gathered from at least one sensor or device, and processed via the location module 205 and determination module 207 to cause a parsing for a determination if the information meets a threshold of relevance. This detection module 203 may be further modified with user preferences and tolerances, which, in part, provide a presentation of the information to at least one of a plurality of devices based on the determination.

In one embodiment, the location module 205 includes an integrated system for a processing of communication information related to geospatial information to cause a parsing for a determination if the geospatial information meets a threshold of relevance including location information to determine location information for one or more points-of-interest. Such location information can be stored in an on-board systems database, modified manually, accessed when prompted by an application 105, or gathered from devices or sensors incorporated into the detection module 203 and processed via the location module 205 to provide point-of-interest and mapping location information. The location module 205 may also be used to correlate geospatial information with mapping and point-of-interest data. This location information may be further modified with user preferences and tolerances, which, in part, provide selective modifications of the location determination system.

In one embodiment, the determination module 207 may process the outputs of the detection module 203 and location module 205 as well as information from other modules for a processing of communication information related to geospatial information to cause a parsing for a determination. For instance, the determination module 207 may output a selection of the most relevant geospatial information using a variety of user preferences and tolerances. These determination may be constructed based on a manual user input, system setting, or as part of a machine learning algorithm. In one scenario, the determination module 207 may provide feedback iteratively to the detection module 203, location module 205 or one of the other modules. In another embodiment, the determination module 207 may process geospatial information to cause a presentation of content information in the most suitable manner for one or more users.

In one embodiment, the user interface module 209 may be configured for exchanging information between UE 101 and the geographic database 111, and/or one or more third-party content providers. In another embodiment, the user interface module 209 enables presentation of a graphical user interface (GUI) for displaying a presentation of the geospatial information to the plurality of devices, the one or more users, or a combination thereof based, at least in part, on one or more determinations. For example, the user interface module 209 executes a GUI application configured to provide users with a processing of location information and semantic analysis of one or more communication sessions. The user interface module 209 employs various application programming interfaces (APIs) or other function calls corresponding to the applications 105 of UE 101, thus enabling the display of graphics primitives such as menus, buttons, data entry fields, etc., for generating the user interface elements. Still further, the user interface module 209 may be configured to operate in connection with augmented reality (AR) processing techniques, wherein various different applications, graphic elements and features may interact. For example, the user interface module 209 may coordinate the presentation of augmented reality map images in conjunction with content information for a given location or in response to a selected point-of-interest representation. In a further embodiment, the user interface module 209 may cause an interfacing of the geospatial information with one or more users to include, at least in part, the one or more annotations.

In one embodiment, the presentation module 211 may process the outputs of the determination module 207 as well as information from other modules for a determination if the information meets a threshold of relevance, and a presentation of the geospatial information to a plurality of devices based on the determination. For instance, the presentation module 211 may output one or more annotations associated with the geospatial information. These annotations may be determined by a manual user input, an automatic determination, or a combination thereof. Furthermore, the presentation module 211 may include an algorithm for determining historical experience information associating the geospatial information with respect to the plurality of devices, the one or more users, or a combination thereof. Also, the presentation module 211 may include an algorithm for a presentation of the geospatial information via one or more mapping applications, one or more mapping user interfaces, or a combination executing respectively on the plurality of devices. In one scenario, the presentation module 211 may provide feedback iteratively to one of the other modules based on user feedback or other system requirements. In another embodiment, the presentation module 211 may cause a presentation of content information in the most suitable manner for a consistent user experience.

Figure 3:
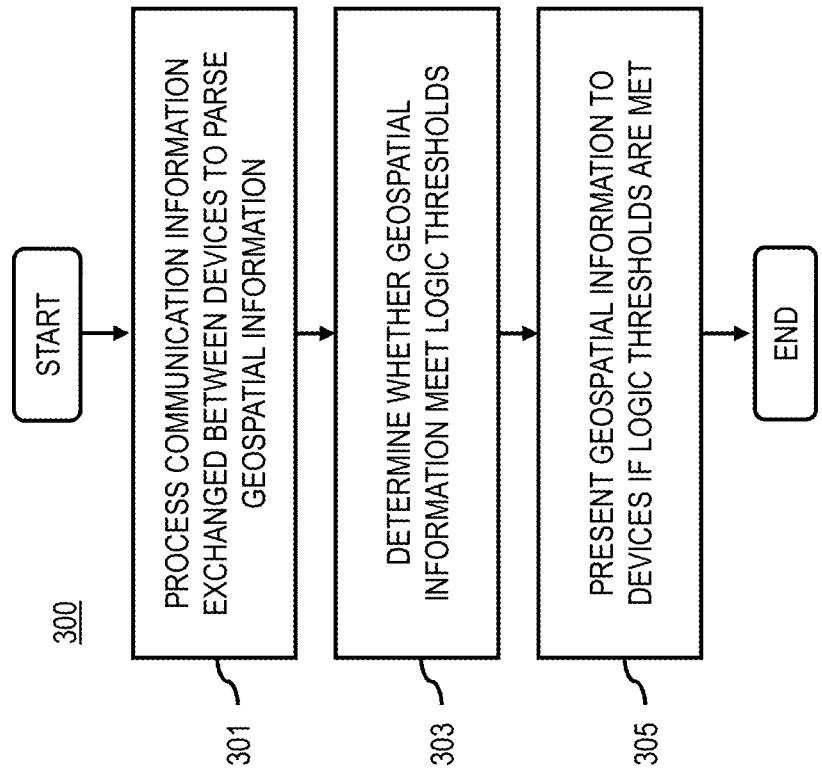
FIG. 3 is a flowchart of a process for providing shared annotations and recall of geospatial information, according to one embodiment.
Figure 9:
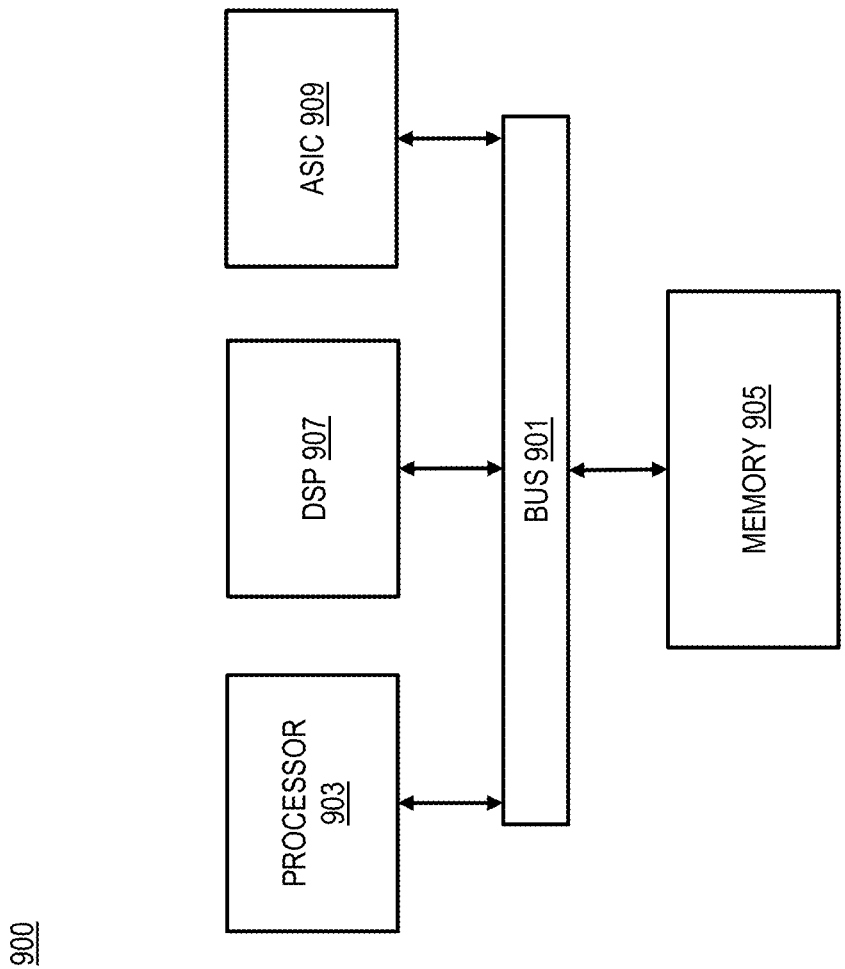
FIG. 9 is a diagram of a chip set that can be used to implement an embodiment of the invention.

FIG. 3 is a flowchart of a processing of communication information related to geospatial information to cause a parsing for a determination if the information meets a threshold of relevance, and a presentation of the information to a plurality of devices based on the determination, according to one embodiment. In one embodiment, the user interface platform performs the process 300 and is implemented in, for instance, a chip set including a processor and a memory as shown in FIG. 9.

In step 301, the geospatial information sharing platform 103 may process communication information that is exchanged between a plurality of devices engaged in a communication session and causes, at least in part, a parsing of geospatial information from the communication information. In one or more embodiments, the geospatial information sharing platform 103 may process a variety of information during one or more communication sessions. In one scenario, this may include text, audio, or video based communication in which one or more users discuss or relate geospatial information, such as has been described, and may include point-of-interest information, route information, location information, and the like. In one scenario, the user interface platform may process the geospatial information if it is determined to be of potential relevance according to one or more algorithms. Such algorithms may include language recognition, semantic analysis, and other relevant linguistic functions.

In step 303, the geospatial information sharing platform 103 may determine whether the geospatial information meet one or more logic thresholds for determining a potential relevance of the geospatial information. In one embodiment, the geospatial information sharing platform 103 may employ one or more algorithms to recognize the geospatial information including text, audio, or video related recognition algorithms. In one scenario, the algorithms may include and employ a variety of techniques to recognize representative (linguistic, etc.) features of this geospatial information. Such algorithms may analyze speech information, text information, visual images, a combination or other like symbols. In one scenario, more sophisticated linguistic algorithms may be employed, such as may recognize parts of speech, past/future tense, positive/negative associations, syntactic structure, language statistics (word frequency, etc.), contextual information and other like attributes as may be relevant for associating geospatial information with an attribute, a user device, a user, a communication session, or other like relationship. In one scenario, the geospatial information sharing platform 103 may subsequently categorize the geospatial information as one or more of possible kinds of geospatial type information—points-of-interest, routes, locations, and other like designations as may be applicable to one or more mapping applications.

In step 305, the geospatial information sharing platform 103 may cause, a presentation of the geospatial information based on the determination. In one embodiment, the geospatial information sharing platform 103 may present communicated information (text, audio, voice, etc.) as a user annotation associated with a particular point-of-interest (or route, etc.). An example of which may be seen in FIG. 6. In multiple scenarios, a particular user image, annotation, representation, or other like attribute may be linked to a user interface map view including the user geospatial information in the context of a map/geospatial background. In one scenario, the conversation module 201 may include a plurality of users within a conversation thread in which both the user geospatial information and the mapping background are mirrored across a plurality of devices. In one scenario, the geospatial information sharing platform 103 may mirror the information precisely, so that one or more of a map view, user annotations, point-of-interest information, and other like information are uniform across a plurality of devices. In another scenario, the geospatial information sharing platform 103 may subject the mirrored information to individual preferences/tolerances so that one or more of a map view, user annotations, point-of-interest information, and other like information are personalized with an option of a degree of uniformity in selected attributes.

Figure 4:
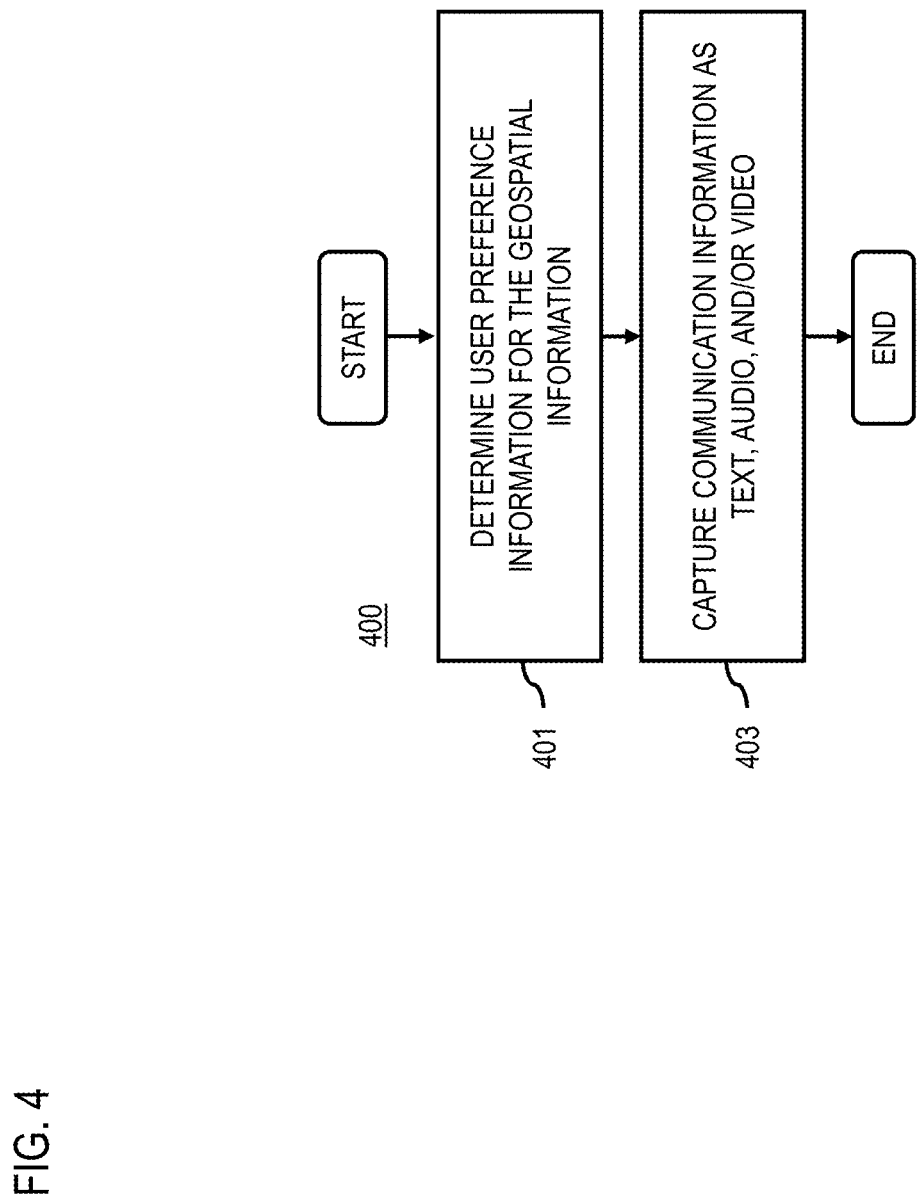
FIG. 4 is a flowchart of a process for applying user preference information to logic thresholds for providing shared annotation and recall of geospatial information, according to one embodiment.

FIG. 4 is a flowchart of a determining user preference information for the geospatial information based on the context or the semantic rules and causing a capturing of the communication information during the communication session as textual information, audio information, video information, or a combination thereof, according to one embodiment. In one embodiment, the user interface platform performs the process 400 and is implemented in, for instance, a chip set including a processor and a memory as shown in FIG. 9.

In step 401, the geospatial information sharing platform 103 may determine user preference information for the geospatial information based on the at least one context, the one or more semantic rules, or a combination thereof. In one embodiment, the geospatial information sharing platform 103 by way of one or more users of a communication session may designate one or more individual preferences, which may be applicable to the geospatial information, the user interface (view point, etc.), mapping application, and other like information. In one scenario, the user may select to include or to not include geospatial information from a particular communication session. In one scenario, such selectivity may depend on the interest or importance of the conversation as a whole, the complexity of the information communicated, and other like contextual information. In another scenario, the geospatial information sharing platform 103 may select the type of information to be applicable to one or more mapping applications. As an example use case, in one scenario, a user may only be interested in restaurant information, and thus choose to record or take part in conversation threads pertaining to restaurants. In one embodiment, the geospatial information sharing platform 103 by way of one or more users may determine whether the geospatial information meet one or more logic thresholds based on user preference information. In multiple scenarios, the logic thresholds may be of varied types, such as particular points-of-interest, types of information (restaurants, etc.), word frequencies; conformity with map locations, logo information, visual representations; and other like frameworks.

In step 403, the geospatial information sharing platform 103 may cause a capturing of the communication information during the communication session. In multiple embodiments, the geospatial information sharing platform 103 may extract the information from any of a text-based communication session, an audio-based communication session, a video-based communication session, or a combination thereof. In one embodiment, the geospatial information sharing platform 103 may capture geospatial information in a variety of forms from the communication session, such as from textual information, audio information, video information, or a combination thereof. In one scenario, such information may be analyzed to determine geospatial information content of relevance, which may be subsequently extracted and integrated with one or more mapping applications. In one embodiment, the geospatial information sharing platform 103 may determine the parsing of the geospatial information, the presentation of the geospatial information, or a combination thereof, such that the parsing and subsequent presentation through a user interface module 209 is performed in real-time during the communication session. In one scenario, the geospatial information sharing platform 103 may include an integration of the geospatial information recognition algorithms with a mapping application in real-time. In one scenario, as an example use case, a plurality of users may be engaged in a conversation while viewing a user-interface based map application. A user may engage in a conversation using one of a variety of means (text, voice, video, etc.) and view one or more annotations in real-time containing information that was extracted during the conversation. As discussed the algorithms may extract the data based on logical thresholds including the relevance of the conversation information to the geospatially based mapping application. In one scenario, this information may be viewed via the user interface module 209 as user texts, images, audio, video, then stored for one or more locations, so the said information may be viewed as an integrated part of the mapping information.

Figure 5:
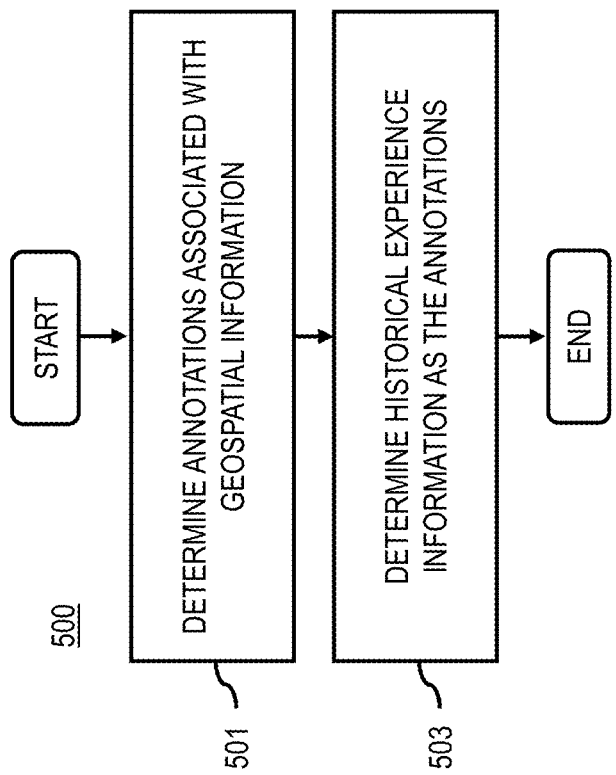
FIG. 5 is a flowchart of a process for determining annotations associated with geospatial information, according to one embodiment.

FIG. 5 is a flowchart of a determination of one or more annotations associated with the geospatial information and historical experience information associating the geospatial information with respect to the plurality of devices, the one or more users, or a combination thereof, according to one embodiment. In one embodiment, the user interface platform performs the process 500 and is implemented in, for instance, a chip set including a processor and a memory as shown in FIG. 9.

In step 501, the geospatial information sharing platform 103 may determine one or more annotations associated with the geospatial information. In one embodiment, the geospatial information sharing platform 103 may recognize the communicated information via the detection module 203 as containing relevant geospatial information. In one scenario, the user interface module 209 may present one or more annotations containing this information in one of a multitude of forms, such as text on the map, user images (to indicate the user, location information, etc.), logos, video, and other like information as may be relevant to the mapping application for the communication of geospatial information from one or more users. In one scenario, the geospatial information sharing platform 103 may include a communication session as a conversation thread within a mapping application in accord with the user interface module 209 and the presentation module 211. In one scenario, one or more conversation threads may be accessed automatically when using the application. In another scenario, one or more conversation threads may be accessed manually as a point-and-click selection, a menu option, or otherwise selected in one or more analogous manners. As an example use case, in one scenario, the conversation around geospatial information in the context of a mapping application may occur via a social media framework, such as is known in the art. In one scenario, the detection module 203 may determine the type of annotations that are to be included in one or more mapping applications. In another scenario, the type of annotations may be chosen by one or more users based on one or more selection options (point-and-click, menus, etc.).

In step 503, the geospatial information sharing platform 103 may determine historical experience information. In one embodiment, the geospatial information sharing platform 103 may determine the geospatial information with respect to one or more of the plurality of devices, the one or more users, or a combination thereof. In one scenario, this may be performed via the user interface platform, iteratively, over one or more time periods. In one scenario, the geospatial information sharing platform 103 may catalogue geospatial information for an individual or a plurality of individuals on one or more devices. In one scenario, a user may have access to stored historical experience information for one or more devices over one or more communication sessions. In one scenario, the geospatial information sharing platform 103 may subsequently be able to retrieve historical experience information containing accumulated geospatial information of relevance for a multiplicity of features of a mapping application, such as that pertaining to points-of-interest, routes, locations, etc.

Figure 6:
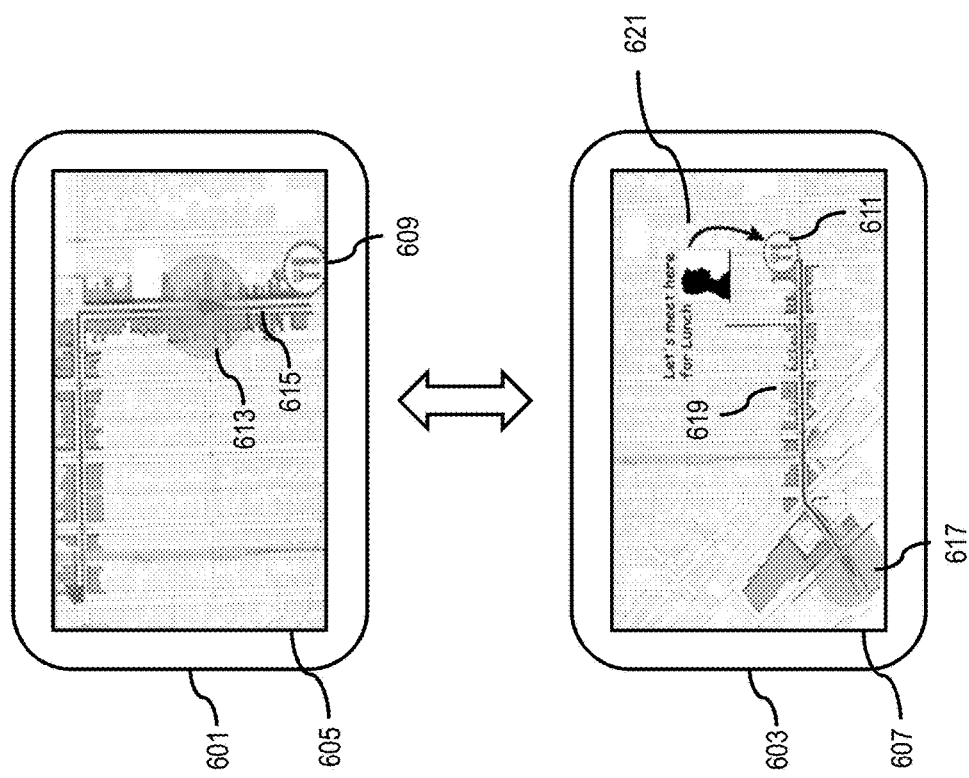
FIG. 6 is a diagram of user interfaces for providing shared annotations and recall of geospatial information, according to various embodiments.

FIG. 6 is a diagram of user interfaces for providing shared annotations and recall of geospatial information, according to various embodiments. In the example of FIG. 6, a first user operating device 601 is engaged in a telephone conversation with a second user operating device 603 about where to have lunch. The devices 601 and 603, for instance, are configured to share geospatial information using the services of the geospatial information sharing platform 103. Accordingly, the geospatial information sharing platform 103 has detected the initiation of the conversation or communication sessions between the devices 601 and 603, and has initiated and capturing and voice recognition of the audio conversation to parse for geospatial and related information.

In this example, via the voice recognition, the geospatial information sharing platform 103 detects the following keywords: "lunch" "where". These close mention of these two words satisfy, for instance, a semantic rule to indicate to the geospatial information sharing platform 103 that the discussion concerns a request for geospatial information. Additionally, the geospatial information sharing platform 103 parses five mentions of Restaurant A between the two users, which satisfies its logic threshold for triggering a map presentation of Restaurant A.

As a result, as shown in FIG. 6, both devices 601 and 603 present respective user interfaces 605 and 607 to indicate respective representations 609 and 611 of Restaurant A. The user interfaces 605 and 607 are generated via respective mapping applications 105 executing on the devices 601 and 603 and can present information that is personalized for each individual user as well as the commonly shared geospatial information (i.e., the location of Restaurant A). For example, in user interface 601, the personalized information includes a current location and heading 613 of the device 601 as well as a calculated route 615 to Restaurant A. In user interface 607, similar information is presented but is customized to the specific location 617 of the device and the route 619 from the location 617 to Restaurant A.

Additionally, in this example, the first user has provided an annotation to indicate "Let's meet here for lunch" with an arrow pointing to Restaurant A at device 601. This annotation is then transmitted (e.g., in real time) from device 601 to device 603 and presented as annotation 621 in user interface 607. In this example, the geospatial information sharing platform 103 has received the annotation from the first user at device 601 via a voice input and has created the annotation 621 based on the voice input.

Figure 7:
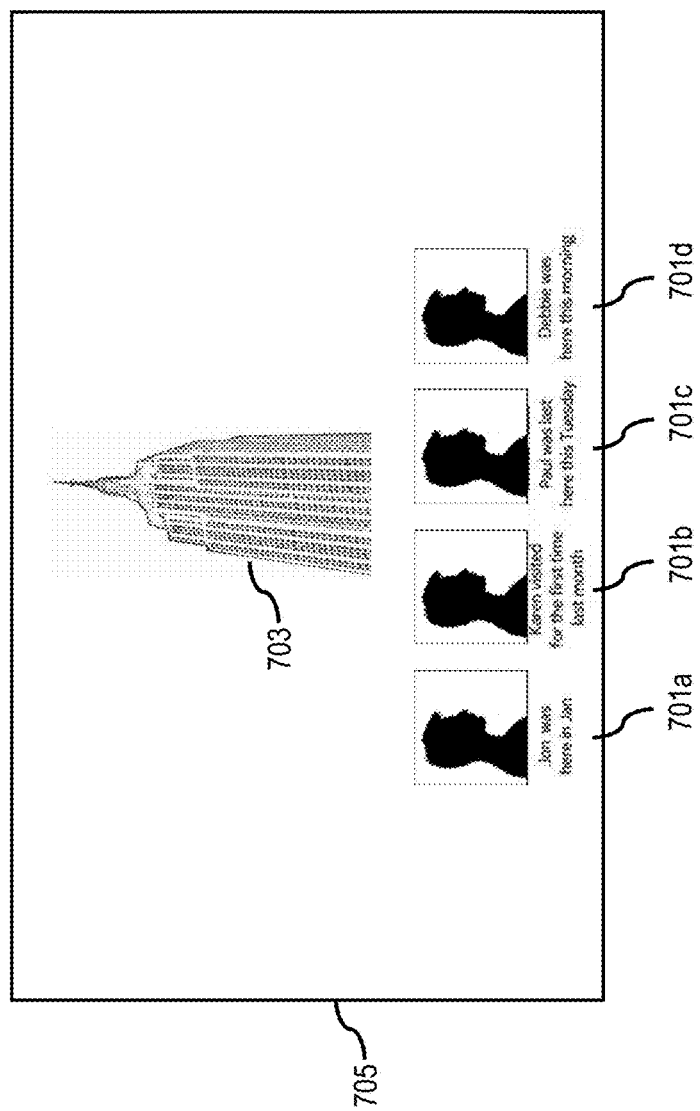
FIG. 7 is a diagram of a user interface for sharing historical geospatial information, according to one embodiment.

FIG. 7 is a diagram of a user interface for sharing historical geospatial information, according to one embodiment. In the example of FIG. 7, the geospatial information sharing platform 103 detects that users 701a-701d are engaged in a communication session. The geospatial information sharing platform 103 monitors the communication information (e.g., captures and parses conversation content) to determine that POI 703 has been mentioned by three of the four users a total of ten times, thereby meeting a logic threshold for presenting geospatial information and related annotations to the users 701*a*-701*d*.

Accordingly, the geospatial information sharing platform 103 initiates a presentation of a user interface 705 to present information related to the POI 705 (e.g., geospatial information and related annotations) at respective devices of the users 701*a*-701*d*. In this example, the geospatial information sharing platform 103 has been configured to automatically annotate the POI 703 with historical experience information concerning the POI 705. The geospatial information sharing platform 103 queries for the historical experience information of the users 701*a*-701*d* and uses that information to annotate the user interface 705. In this case, the annotations are as follows: for user 701*a*, "Jon was here in Jan"; for user 701*b*, "Karen visited for the first time last month"; for user 701*c*, "Paul was last here this Tuesday"; and for user 701*d*, "Debbie was here this morning".

In one embodiment, the historical experience information as well as a history of annotations and conversations can be derived from SMS messages, emails, and social media discussions. These messages can be stored in a database along with location data, which can be used to retrieve the conversation when browsing a location.

The processes described herein for providing shared annotations and recall of geospatial information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
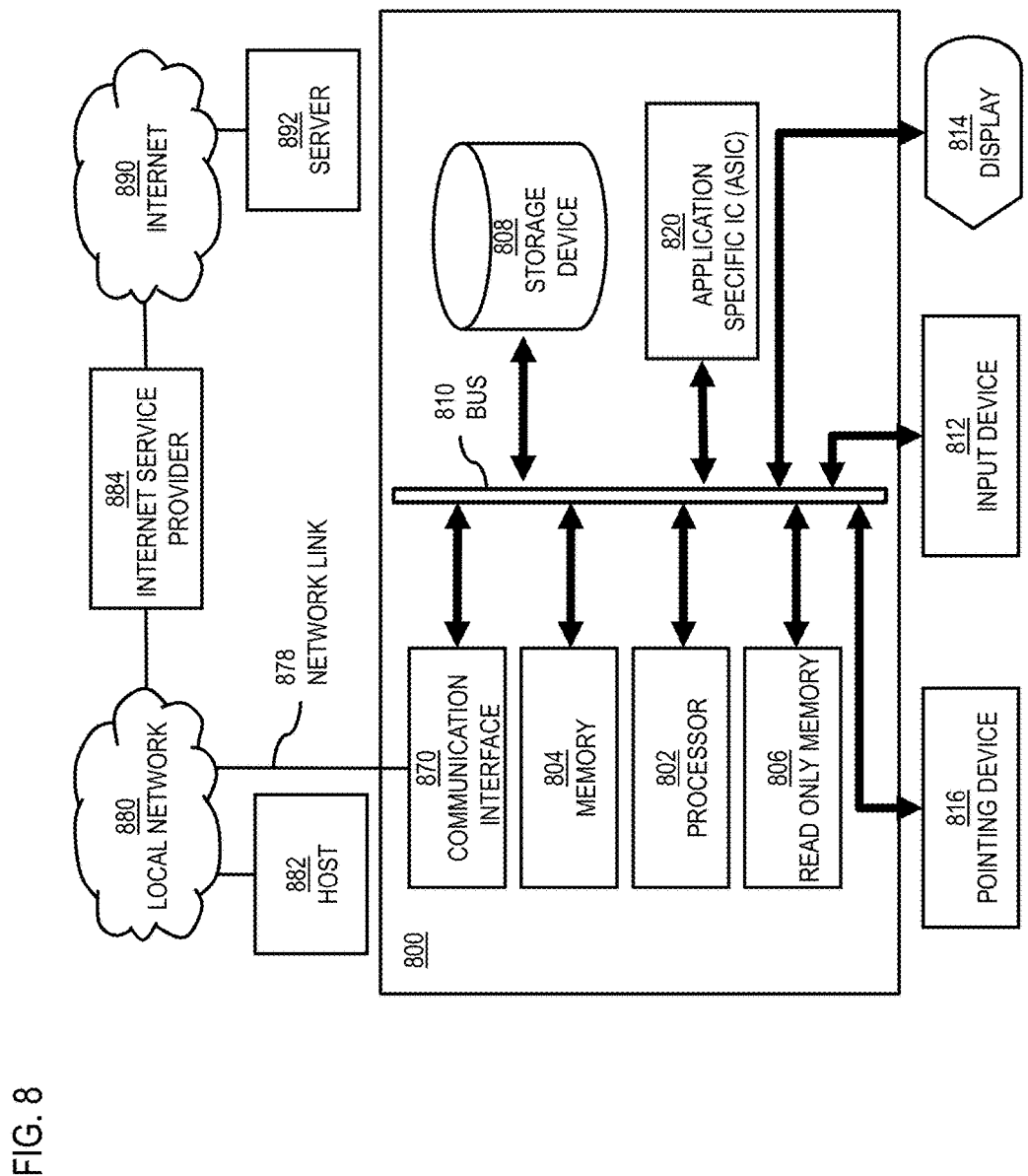
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide shared annotations and recall of geospatial information as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing shared annotations and recall of geospatial information.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing shared annotations and recall of geospatial information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing shared annotations and recall of geospatial information. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing shared annotations and recall of geospatial information, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 107 for providing shared annotations and recall of geospatial information to the UEs 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide shared annotations and recall of geospatial information as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing shared annotations and recall of geospatial information.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide shared annotations and recall of geospatial information. The memory 905 also stores the data associated with or generated by the execution of the inventive steps.

Figure 10:
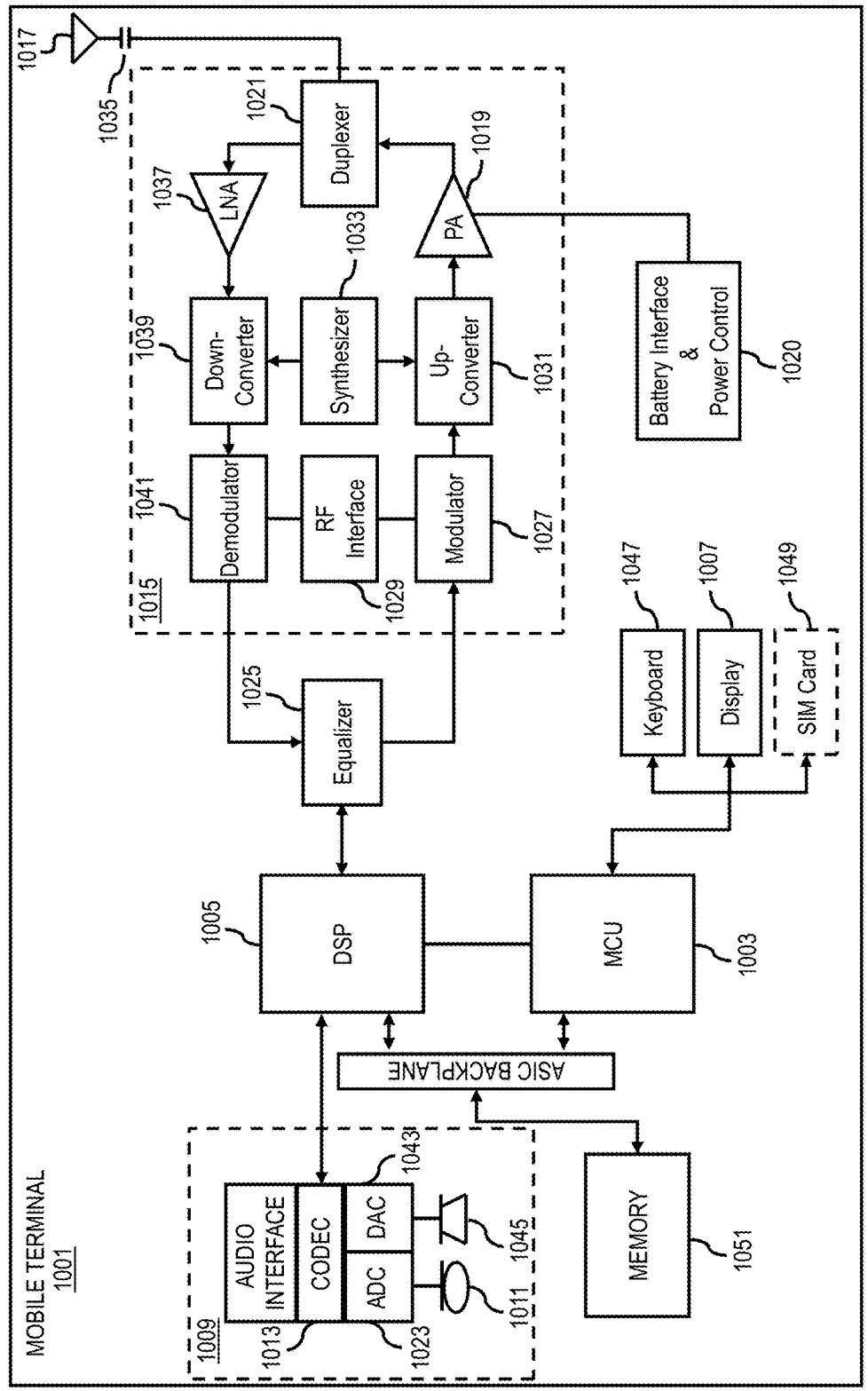
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing shared annotations and recall of geospatial information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing shared annotations and recall of geospatial information. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide shared annotations and recall of geospatial information. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
processing communication information exchanged between a plurality of devices engaged in a communication session to cause, at least in part, a parsing of geospatial information from the communication information;
determining whether the geospatial information meet, at least in part, one or more logic thresholds, wherein the one or more logic thresholds are for determining a potential relevance of the geospatial information to the communication session, the plurality of devices, one or more users of the plurality of devices, or a combination thereof; and causing, at least in part, a presentation of the geospatial information to at least one of the plurality of devices, the one or more users, or a combination thereof based, at least in part, on the determination, wherein the geospatial information includes one or more of a name of a point of interest, a particular route, and a particular geographic location; and determining one or more annotations associated with the geospatial information;

wherein the presentation of the geospatial information includes, at least in part, a presentation of the one or more annotations to at least one of the plurality of devices, the one or more users, or a combination thereof, and wherein the one or more annotations are determined based on user information or historical experience information associated with the geospatial information.

2. A method of claim 1, wherein one or more logic thresholds include, at least in part, a predetermined number of times the geospatial information is mentioned during the communication session, and wherein the communication session comprises at least one of voice calling, video calling, and texting between the plurality of devices.

3. A method of claim 1, wherein the one or more logic thresholds include, at least in part, one or more semantic rules for determining at least one context associated with the geospatial information with respect to the communication session.

4. A method of claim 3, further comprising:

determining user preference information for the geospatial information based, at least in part, on the at least one context, the one or more semantic rules, or a combination thereof, wherein the determination of whether the geospatial information meets, at least in part, the one or more logic thresholds is based, at least in part, on the user preference information.

5. A method of claim 1, wherein the parsing of the geospatial information, the presentation of the geospatial information, or a combination thereof is performed in real-time during the communication session.

6. A method of claim 1, wherein the one or more annotations are determined by a manual user input, an automatic determination, or a combination thereof.

7. A method of claim 1, wherein the presentation of the geospatial information is via one or more mapping applications, one or more mapping user interfaces, or a combination executing respectively on the plurality of devices.

8. An apparatus comprising:

at least one processor; and at least one memory including computer program code for one or more programs, the at least one memory and the computer program code configured to, with the at least one processor, cause the apparatus to perform at least the following, process communication information exchanged between a plurality of devices engaged in a communication session to cause, at least in part, a parsing of geospatial information from the communication information;

determine whether the geospatial information meet, at least in part, one or more logic thresholds, wherein the one or more logic thresholds are for determining a potential relevance of the geospatial information to the communication session, the plurality of devices, one or more users of the plurality of devices, or a combination thereof; and cause, at least in part, a presentation of the geospatial information to at least one of the plurality of devices, the one or more users, or a combination thereof based, at least in part, on the determination, wherein the geospatial information includes one or more of a name of a point of interest, a particular route, and a particular geographic location; and determine one or more annotations associated with the geospatial information;

wherein the presentation of the geospatial information includes, at least in part, a presentation of the one or more annotations to at least one of the plurality of devices, the one or more users, or a combination thereof, and wherein the one or more annotations are determined based on user information or historical experience information associated with the geospatial information.

9. An apparatus of claim 8, wherein one or more logic thresholds include, at least in part, a predetermined number of times the geospatial information is mentioned during the communication session, and wherein the communication session comprises at least one of voice calling, video calling, and texting between the plurality of devices.

10. An apparatus of claim 8, wherein the one or more logic thresholds include, at least in part, one or more semantic rules for determining at least one context associated with the geospatial information with respect to the communication session.

11. An apparatus of claim 10, wherein the apparatus is further caused to:

determine user preference information for the geospatial information based, at least in part, on the at least one context, the one or more semantic rules, or a combination thereof, wherein the determination of whether the geospatial information meets, at least in part, the one or more logic thresholds is based, at least in part, on the user preference information.

12. An apparatus of claim 8, wherein the one or more annotations are determined by a manual user input, an automatic determination, or a combination thereof.

13. A non-transitory computer-readable storage medium carrying one or more sequences of one or more instructions which, when executed by one or more processors, cause an apparatus to at least perform the following steps:

processing communication information exchanged between a plurality of devices engaged in a communication session to cause, at least in part, a parsing of geospatial information from the communication information;

determining whether the geospatial information meet, at least in part, one or more logic thresholds, wherein the one or more logic thresholds are for determining a potential relevance of the geospatial information to the communication session, the plurality of devices, one or more users of the plurality of devices, or a combination thereof; and causing, at least in part, a presentation of the geospatial information to at least one of the plurality of devices, the one or more users, or a combination thereof based, at least in part, on the determination, wherein the geospatial information includes one or more of a name of a point of interest, a particular route, and a particular geographic location; and determining one or more annotations associated with the geospatial information;

wherein the presentation of the geospatial information includes, at least in part, a presentation of the one or more annotations to at least one of the plurality of devices, the one or more users, or a combination thereof, and wherein the one or more annotations are determined based on user information or historical experience information associated with the geospatial information.

14. A non-transitory computer-readable storage medium of claim 13, wherein the one or more logic thresholds include, at least in part, one or more semantic rules for determining at least one context associated with the geospatial information with respect to the communication session.

15. A non-transitory computer-readable storage medium of claim 14, further comprising:

determining user preference information for the geospatial information based, at least in part, on the at least one context, the one or more semantic rules, or a combination thereof, wherein the determination of whether the geospatial information meet, at least in part, the one or more logic thresholds is based, at least in part, on the user preference information.

* * * * *